United States Patent [19]

Nguyen et al.

[11] Patent Number: 5,680,900
[45] Date of Patent: Oct. 28, 1997

[54] METHOD FOR ENHANCING FLUID LOSS CONTROL IN SUBTERRANEAN FORMATION

[75] Inventors: Philip D. Nguyen; David L. Brown; Jimmie D. Weaver; Wes C. Lavin; Steven F. Wilson, all of Duncan, Okla.

[73] Assignee: Halliburton Energy Services Inc., Duncan, Okla.

[21] Appl. No.: 685,315

[22] Filed: Jul. 23, 1996

[51] Int. Cl.⁶ .............. E21B 21/00; E21B 43/25; E21B 43/26
[52] U.S. Cl. .............. 166/295; 166/283; 166/294; 175/72; 507/110; 507/114; 507/211; 507/216; 507/903
[58] Field of Search .............. 166/75.15, 90.1, 166/282, 283, 294, 295; 175/72; 507/110, 114, 211, 216, 903

[56] References Cited

U.S. PATENT DOCUMENTS

| | | | |
|---|---|---|---|
| 3,208,524 | 9/1965 | Horner et al. | 175/72 X |
| 3,252,904 | 5/1966 | Carpenter | 166/283 |
| 3,704,360 | 11/1972 | Nimerick | 175/72 X |
| 3,818,998 | 6/1974 | Hessert | 175/72 |
| 4,544,032 | 10/1985 | Echols | 166/90.1 X |
| 4,679,628 | 7/1987 | Luetzelschwab | 166/275 |
| 5,052,486 | 10/1991 | Wilson | 507/216 X |
| 5,067,565 | 11/1991 | Holtmyer et al. | 507/216 X |
| 5,304,620 | 4/1994 | Holtmyer et al. | 166/308 X |
| 5,439,057 | 8/1995 | Weaver et al. | 166/295 |
| 5,465,792 | 11/1995 | Dawson et al. | 166/295 |

*Primary Examiner*—George A. Suchfield
*Attorney, Agent, or Firm*—Robert A. Kent

[57] ABSTRACT

The present invention provides a method of controlling fluid loss to a permeable formation penetrated by a wellbore. A novel fluid loss agent is prepared by forming a crosslinked polymer gel which then is sheared to break the gel into discrete particles of a particular size range. A slurry then is formed of the particles by dispersing the particles in an aqueous fluid having a density similar to that of the gel particles. The slurry then is introduced into contact with the permeable formation and a filter cake of the particles is formed upon contact with the formation and loss of the slurrying fluid to the formation. The filter cake provides further fluid loss control to the permeable formation.

16 Claims, 1 Drawing Sheet

—■— PARTICLE SIZE GREATER THAN 10 MESH (U.S. SIEVE SERIES)
—♦— PARTICLE SIZE 10-80 MESH
—▲— PARTICLE SIZE 10-80 MESH WITH GREATER THAN 50% BELOW 20 MESH

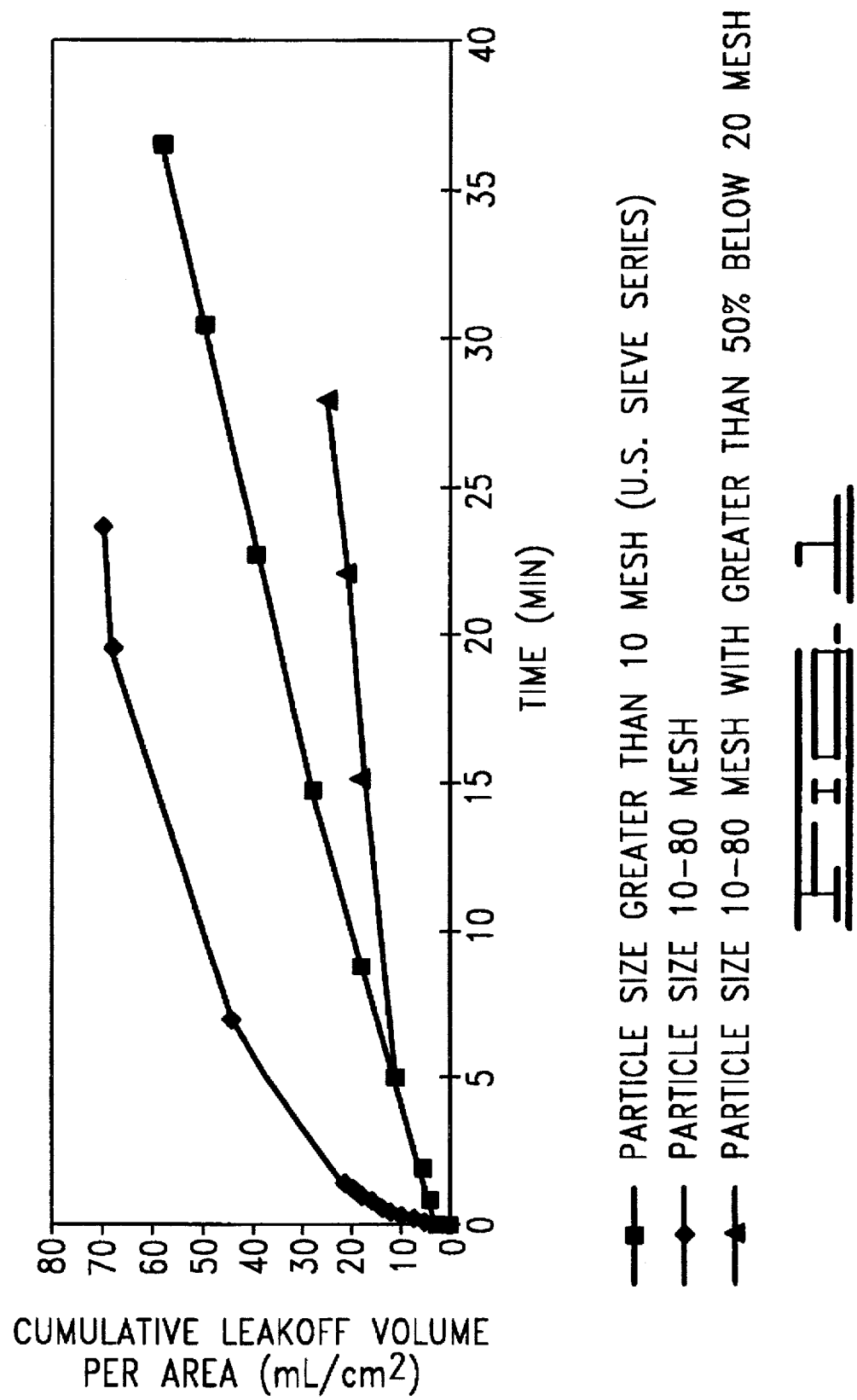

METHOD FOR ENHANCING FLUID LOSS CONTROL IN SUBTERRANEAN FORMATION

BACKGROUND OF THE INVENTION

The present invention relates to novel fluid loss control agents for use in drilling, completion and stimulation fluids. More particularly the present invention relates to the use of a slurry of particulate crosslinked polymer gels to form a filter cake to reduce treatment fluid loss to permeable formations.

During the drilling of an oilwell, a usually aqueous fluid is injected into the well through the drill pipe and recirculated to the surface in the annular area between the wellbore wall and the drill string. The functions of the drilling fluid include: lubrication of the drill bit, transportation of cuttings to the surface, overbalancing formation pressure to prevent an influx of oil, gas or water into the well, maintenance of hole stability until casings can be set, suspension of solids when the fluid is not being circulated and minimizing fluid loss into and possible associated damage/instability to the formation through which drilling is taking place.

Proper overbalancing of formation pressure is obtained by establishing fluid density at the desired level usually via the addition of barite. Transportation of cuttings and their suspension when the fluid is not circulating is related to the fluid viscosity and thixotropy which depend on solids content and/or use of a polymer. Fluid loss control is obtained also by the use of clays and/or added polymers.

Fluid properties are constantly monitored during the drilling operations and tailored to accommodate the nature of the formation stratum being encountered at the time. When drilling reaches the producing formation special concern is exercised. Preferentially, low solids content fluids are used to minimize possible productivity loss by solids plugging. Proper fluid density for overbalancing formation pressure may be obtained by using high salt concentration aqueous brines while viscosity and fluid loss control generally are attempted by polymer addition.

When high permeability and/or poorly consolidated formations are penetrated as the zone of interest, a technique referred to as "under-reaming," often is employed in the drilling operations. In this process, the wellbore is drilled through the hydrocarbon bearing zone using conventional techniques and drilling muds. A casing generally is set in the wellbore to a point just above the hydrocarbon bearing zone. The hydrocarbon bearing zone then is redrilled using an expandable bit that increases the diameter of the hole. The purpose of the under-reaming is to remove damage from the permeable formation introduced during the initial drilling process by particles of the drilling mud and to increase the exposed surface area of the wellbore. Typically, under-reaming is effected utilizing special "clean" drilling fluids to minimize further formation damage. The high permeability of many hydrocarbon zones allows large quantities of the clean drilling fluid to be lost to the formation. Typical fluids utilized in under-reaming comprise aqueous brines which are viscosified with a polysaccharide polymer to aid in the removal of the drill cuttings. To control fluid loss, solids such as ground salt crystals, calcium carbonate or the like may be added to the fluid to form a filter cake on the face of the formation. This filter cake must be removed prior to or after the zone is gravel packed if hydrocarbon production is to be achieved. The salt crystals can be removed by circulating unsaturated salt brine to dissolve the particles. If this occurs before gravel packing, the circulating fluid often causes sloughing of the formation into the wellbore and yet further loss of fluids to the formation. If removal is attempted after the gravel pack, the gravel packing material often traps the particles against the formation and makes removal much more difficult. Other particulates, such as the carbonates can be removed with circulation of acid, however, the same problems may arise.

Completion fluids are those fluids used after drilling is complete and during the steps of completing the well. Completion can include cementing the casing in the well, perforating the well, setting the tubing, pump and the like. Completion fluids are generally used to control the well pressure, provide fluid loss control, prevent the collapse of tubing from overpressure and to reduce or prevent corrosion of the casing when left in a wellbore as a packer fluid above the production packer. In such an instance the fluid is placed in the annulus between the casing and production tubing string above the production packer to seal the annulus against the influx of formation fluids. Because a packer fluid may remain in a wellbore for many years before any remedial work is needed, such a fluid generally should be temperature stable, non-settling, non-corrosive and non-damaging to the formation.

Stimulation of hydrocarbon bearing formations typically is effected to increase the exposed area of a subterranean formation for flow of a hydrocarbon to a wellbore. Commonly, fracturing operations are performed to produce conductive channels from the wellbore into the formation. The channels may have a particulate proppant introduced therein to assist in maintaining the channels open within the formation. While creating fractures in low permeability formation is often considered a routine technique, the formation of fractures in higher permeability formations (100 millidarcy and greater) presents several problems. Effective fluid loss control is essential to creation of a fracture of any length in a high permeability formation. Typical fluid loss control additives for stimulation fluids comprise the ground salt, ground calcium carbonate and the like previously discussed in regard to clean drilling fluids. These materials are difficult to remove from the created fractures, particularly after the fracture is propped open by the introduction of a propping agent. The presence of unremoved fluid loss additives can result in a significant reduction in the production flow capacity of the created fracture. If an attempt is made to increase the stimulation fluid viscosity to a level whereby fluid loss can be controlled without significant quantities of particulate fluid loss additives, the friction pressures resulting from the higher viscosity fluid limit the pumping rate and diminish the ability to produce a desired fracture length.

U.S. Pat. No. 5,439,057 relates to one solution to the above described problems. The reference discloses the formation of a crosslinked polymer gel which then is sheared into discrete particles having an average diameter in the range of from about 1 to about 10 mm. The sheared particles then are dispersed in an aqueous fluid and introduced into a subterranean formation to form a filter cake to assist in fluid loss control to the permeable formation. While this method substantially increases fluid loss control, it would be desirable to further reduce the quantity of fluid lost to the formation during a treatment performed upon the subterranean formation.

The present invention has been developed with a view to providing improved fluid loss control in drilling fluids, completion fluids, stimulation fluids and the like.

SUMMARY OF THE INVENTION

The surprising discovery now has been made that a fluid loss control agent can be prepared by forming a crosslinked polymer gel which then is broken into small crosslinked gel particles having an average diameter of less than about 1 mm. Preferably, the particles have a size distribution of from about 10 to about 80 mesh on the U.S. Sieve Series with at least about 30 percent having a particle size below about 20 mesh. The particles of crosslinked gel are dispersed into a fluid which may include additional solid particulates for use as a fluid loss control agent upon introduction into a subterranean formation.

BRIEF DESCRIPTION OF THE DRAWING

FIG. 1 is a graphical illustration of the effect of particle size upon static fluid loss through high permeability core.

DESCRIPTION OF THE PREFERRED EMBODIMENTS

The method of the present invention may be accomplished through the use of substantially any of the well known natural and synthetic polymers which are capable of viscosifying an aqueous fluid and which then can be crosslinked to form a substantially rigid gel structure. The gelling agent can comprise a hydratable polysaccharide such as guar, guar derivatives and cellulose derivatives or a synthetic polymer such as an acrylamide, acrylates and copolymers thereof or the like.

The crosslinking agent can comprise substantially any of the conventionally known compounds such as, for example borates, compounds capable of providing titanium IV ions or zirconium IV ions, aluminum III ions or antimony V ions and the like. The crosslinking agent also can comprise certain novel compounds such as a Lewis base or Bronsted-Lowry base when certain graft copolymers are utilized as the gelling agent. The only requirement of the crosslinking agent is that it produce a crosslinked gel upon additions of an effective amount with the gelling agent.

To facilitate a complete understanding of the present invention, the following description will be directed to the use of particularly preferred polymers for use as the gelling agent. It is to be understood that such specificity is not to be construed as a limitation upon the scope of the present invention but is intended to aid in an understanding of the method.

A detailed description of the methods of manufacture of the preferred graft polymers of the present invention is set forth in U.S. Pat. No. 5,304,620, issued Apr. 19, 1994, entitled "Method Of Crosslinking Cellulose And Guar Derivatives For Treating Subterranean Formations," the entire disclosure of which is incorporated herein by reference.

An aqueous liquid is used to solubilize the polymer or copolymer of the present invention. The term "aqueous liquid" is used hereafter to mean any liquid containing sufficient water to at least partially hydrate the copolymer and result in an increase in the viscosity of the fluid. Aqueous liquids used in oilfield operations normally contain sodium chloride, potassium chloride, calcium chloride, sodium bromide and other bromides, ammonium chloride, tetramethylammonium chloride or the like to weight the fluid or inhibit the swelling of clays generally found in subterranean formations. The pH of the aqueous liquid must be compatible with the selected crosslinking agent and must not adversely affect the hydration of the copolymer.

The term "vinyl phosphonic acid or VPA" as used herein includes not only the acid monomers and polymers but is also intended to include the aqueous soluble salts such as sodium or potassium vinyl phosphate and the like whereby a vinyl phosphonate ion is formed upon dissolution in an aqueous fluid as well as mono esters of vinyl phosphonic acid.

The cellulose derivative of this invention is preferably a hydroxyalkyl cellulose having a hydroxyalkyl molar substitution from about 1.5 to about 3.0. Molar substitution is defined as the average number of moles of a substituent group present per anhydroglucose unit of the cellulose material. The alkyl group is selected from the group of ethyl, propyl and mixtures thereof. The preferred hydroxyalkyl cellulose is hydroxyethyl cellulose (HEC) having a molar substitution in the range of about 1.8 to about 2.5. Preferably in this invention, the hydroxyalkylation of the cellulose is preformed in a separate reaction. Hydroxyethyl cellulose is usually formed by reacting ethylene oxide with cellulose under extreme alkaline conditions and is available commercially.

The copolymers of the present invention are rendered crosslinkable by grafting monomers comprising a vinyl phosphonic acid to the cellulose derivative. The monomers have the reactive $CH_2=C-$ moiety that is believed to enable the monomer to attach to the cellulose derivative.

Typically, graft copolymerizations are carried out in aqueous media wherein the polymer is dissolved or dispersed. The ratio of cellulose derivative to aqueous medium ranges from about 1 gram per 100 ml to about 1 gram per 2 ml. The preferred ratio is from about 1 gram per 6 ml to 1 gram per 4 ml. The ratio of cellulose derivative to grafting VPA monomer ranges from about 3 grams per 1 ml to about 25 grams per 1 ml. The preferred ratio is from about 6 grams per 1 ml to about 16 grams per 1 ml.

In one embodiment of the present invention, the crosslinkable copolymers are prepared by reacting certain vinyl monomers having a crosslinkable substituent with a cellulose derivative using a redox system comprising, for example, the reaction product of hydrogen peroxide with a ferrous salt. The generalized redox reaction is believed to be represented by the formula:

and the generalized initiation reaction is believed to be represented by the general formula:

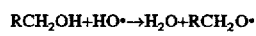

An advantage of this initiator is that radical production occurs at a reasonable rate over a wide temperature range whereby reactions can be carried out at room temperature, if desired. The free radical produced on the cellulose derivative initiates polymerization with the vinyl group of the monomer to produce the graft copolymer.

Typically, the graft copolymerization is carried out in aqueous media wherein the polymer is partially dissolved or dispersed. Copolymers were prepared in acetone/water mixtures containing from about 55 to about 90% acetone. Reactions were carried out in a 1 liter kettle with a stirrer or a 1 liter jar at a temperature of from about 20° to about 60° C. The ratio of cellulose derivative to aqueous medium ranges from about 1 gram per 100 ml. to about 1 gram per 2 ml. The preferred ratio is from about 1 gram per 2 to 5 ml. The ratio of cellulose derivative to grafting VPA monomer ranges from about 5 to about 40 grams per 1 gram of monomer. The preferred ratio is from about 6 to about 16. It is to be understood that the ranges set forth above are merely exemplary and that other temperatures, concentrations and the like maybe utilized to prepare the reaction product.

The polymerization reaction of this embodiment of the invention is chemically initiated by a redox system comprising the reaction product of hydrogen peroxide with a ferrous salt. Ferrous ions may be provided, for example, by salts such as ferrous ammonium sulfate, ferrous chloride, ferrous sulfate, ferrous acetate, ferrous oxalate, ferrous acetylacetonate and the like. A preferred source of ferrous ions is ferrous ammonium sulfate. Alternatively, other commonly used metal ion reductants may be utilized in place of the ferrous ions to generate the free radicals necessary to effect grafting and other forms of hydrogen peroxide such as t-butylhydroperoxide may be used.

The initiator may be added slowly to the reaction material over a time period of about 30 to 90 seconds or longer. Reaction times vary from about 15 minutes to about 4 hours depending upon the reaction conditions or the particular grafting monomer. Grafting reaction efficiency (% of monomer grafted) is generally less than about 75%. After the reaction is complete, the polymerization product is washed with acetone, filtered and dried.

In a preferred method of effecting the graft copolymerization, the grafted polymer product is retained in a substantially storage stable slurry form. Typically, the media comprises a polyglycol, such as polypropylene glycol having molecular weights up to about 1000 such as "PPG-250" to "PPG-1000" polyglycol from Texaco Chemical Co., various polyethylene glycols and homopolymers of 1,2 butylene oxide having a molecular weight of from about 200 to about 400 which is present in an amount of from about 70 to about 95 percent by weight of the media and the remainder generally comprises water. The media also may comprise tetramethylammonium chloride in a similar amount or in admixture with a polyglycol. In a preferred embodiment the polyglycol comprises from about 86 to 92 percent by weight of the media. Reactions were carried out in a 5 liter kettle with a stirrer at a temperature of from about 20° to 60° C. The ratio of cellulose derivative to media ranges from about 1 gram per 100 ml to about 1 gram per 2 ml. The preferred ratio is from about 1 gram per 2 to 5 ml. The reaction media also may include a quantity of a dispersant or thixotrope such as alkyl quaternary ammonium montmorillonite ("CLAYTONE AF" thixotrope from E.C.C. America, Inc.) or dimethyldicocoammonium chloride to facilitate dispersion of the polymer in the media and improve suspension properties. The grafting reaction is performed as previously described using an appropriate redox system such as, for example, the ferrous salt with a source of peroxide. Since the metal ions are not removed from the product by washing as when a dry product is formed, a sequestrant for the metal ions may be added to the slurry at the conclusion of the reaction. The polymerization product has been found to remain readily dispersible or suspended in the slurry form over a period of time to facilitate storage and handling.

Graft copolymers of the present invention solubilize in aqueous liquids and substantially increase the viscosity of aqueous liquids. The viscosity of the copolymer solution is further increased with the addition of a selected crosslinking activator or agent which effects an initiation of a crosslink interaction. Preferred crosslinking activators or agents in accordance with this invention comprise Bronsted-Lowry or Lewis bases. Suitable compounds are believed to include, for example, calcium oxide, magnesium oxide and compounds selected from mono, di and trialkanol amines such as triethanolamine, sodium hydroxide, potassium hydroxide, ammonia, various cocoamines such as Bis(2-hydroxyethyl) cocoamine, various pentamines such as tetraethylenepentamine, and various other water soluble amines, such as propyldiethanolamine, triethylamine, various water soluble borates such as the commercially available product "POLYBOR" an admixture of boric acid and borate salts, from U.S. Borax and the like in the presence of a divalent cation such as calcium or magnesium which is present in at least a trace amount and which may be present in the aqueous liquid utilized to hydrate the copolymer or added as an additional component to the aqueous liquid. Such compounds generally are substantially free of polyvalent metal ions, that is, metal ions having more than one valence state. A particularly preferred crosslinking agent is magnesium oxide.

While the specific mechanism by which the crosslinking occurs is unknown, it is believed that the crosslink is formed through the phosphorus moiety in the graft polymer which is activated by the presence of the Lewis or Bronsted-Lowry base.

While the following description will be directed to the use of magnesium oxide as a crosslinking activator or agent, it is to be understood that the described method would apply generally to any of the other suitable crosslinking agents of the present invention. A base gel is prepared by hydrating the previously described graft copolymer of hydroxyethyl cellulose or hydroxypropyl cellulose, in an aqueous fluid at a pH in the range of from about 0.1 to about 3.5. The graft copolymer can be admixed with the aqueous fluid in an amount of from about 1 to about 175 pounds per 1000 gallons of fluid. After the gelling agent has been substantially hydrated, the base gel is admixed with a quantity of magnesium oxide in an amount of from about 10 to about 40 pounds per 1000 gallons of base gel. In a preferred method of addition, the magnesium oxide is added as an aqueous slurry to facilitate handling of the material.

The crosslinking of the graft copolymer solution may be accomplished in any suitable vessel or apparatus such as, for example, a vertical paddle blender or horizontal ribbon blender or the like. The crosslinked gelled fluid then is suitably sheared to effect formation of discrete particles of the gelled fluid. In one embodiment, the fluid is sheared by passage through a perforated plate at an elevated pressure whereupon the gel breaks into generally small cylindrical shaped particles. Alternatively, the gelled fluid may be passed through a crossed network of thin wires within a circular or square tube to form various geometries of gel particles or other die to form various shapes such as cylinders, rectangles, ovals, kidney shapes and the like.

The effect of particle size upon static fluid loss is graphically illustrated in FIG. 1 for a 25 darcy core sample. The static fluid loss was determined at 150° F. with a differential pressure of 200 psi through use of nitrogen gas and an 11 pound per gallon calcium chloride solution.

Surprisingly, it has been found that superior fluid loss control is effected when the particles have a particle size distribution of from about 10 to about 80 mesh with at least 30 percent having a particle size below about 20 mesh. Preferably at least about 50 percent of the particles have a particle size below 20 mesh and most preferably at least about 70 percent have a particle size below about 20 mesh alternatively, at least about 75 percent have a particle size of 20 mesh or less and preferably at least 80 percent have a particle size of 20 mesh or less. Such particles have an average diameter of its least two dimensions for shapes such as rectangles, squares, and the like of less than about 1 mm. The length of the particle can range from about 0.1 to about 10 mm without any significant adverse effect upon the performance of the particles in fluid loss control.

The particles of crosslinked gelled fluid then are slurried or suspended in an aqueous fluid preferably having a density similar to that of the crosslinked gelled fluid. The aqueous suspension fluid may comprise substantially any of the previously described aqueous fluids and may have a density either greater than or less than that of the crosslinked gelled fluid. Preferable the aqueous suspension fluid has a density within ±0.5 lb/gal of the density of the crosslinked gelled fluid to facilitate formation of the suspension and transport of the particles. If the density varies significantly, a portion of the particulate may dissolve and/or congeal into a solid mass in the fluid that will not be readily redispersible whereby such material is lost to use in the process of the invention thereby increasing costs.

The particulate slurry then may be utilized to provide fluid loss control in a wellbore penetrating a subterranean formation by introduction into the wellbore. A filter cake of the suspended particles of gel is formed upon the face of the formation as fluid loss occurs to the formation. The fluid loss control can be effected when used with drilling, completion and stimulation fluids. The quantity of particulate gel used in accordance with the different aspects of the present invention is that amount which is sufficient to achieve a desired level of fluid loss control. The quantity will depend, to some extent, upon the permeability of the formation and formation temperature, or well as the desired level of fluid loss control.

A beneficial aspect of the use of the graft copolymers described herein is the ability of the particulate gel to be readily broken to a low viscosity fluid to facilitate cleanup of the formation face contacted by the particulate and minimize any potential permeability-loss problem resulting from use of the fluid loss control agent. The crosslinked gel particulate may be readily broken by contacting the particulate with an acidic fluid. The acidic fluid can comprise substantially any fluid having a pH less than that of the crosslinked gel whereby upon contact with the gel the pH of the gel is reduced. Examples of such fluids and compounds include, but are not limited to, hydrochloric acid solutions, organic acids such as fumaric acid, acetic acid, citric acid, polyhydroxyacetic acid, encapsulated forms of acid generating compounds or acids and the like.

A further benefit of use of the graft copolymers is when magnesium oxide is utilized as the crosslinker. An excess of magnesium oxide may be admixed with the gelled fluid during the crosslinking process resulting in the formation of a gel including intimately admixed solid magnesium oxide particles that will provide further assistance to the crosslinked gel particles in providing fluid loss control. Alternatively, other fine particulate materials could be admixed with the polymer gel particles to assist in achieving desired fluid loss control.

The particulate slurry also can contain substantially any other conventional additives, such as for example, gel stabilizers, breakers, clay stabilizers, bactericides, fluid loss additives, surfactants, weighting agents such as hematite, barite or calcium carbonate and the like. The selection of such additives is well within the skill of those experienced in the art.

The following examples are provided to illustrate the utility of the method of the present invention.

EXAMPLE I

The following tests were performed to compare the effectiveness of the prior art particulate gel of U.S. Pat. No. 5,439,057 with the present invention. Cores having a permeability of 25 Darcies were placed into high pressure fluid loss cells and the temperature was raised to 150° F. A solution of API brine 5% by weight ammonium chloride was flowed through each core to saturate the sample. A 200 psi differential pressure was maintained on the cores during the tests using nitrogen gas. A gel solution was prepared by admixing the equivalent of 120 pounds of polymer per 1000 gallons of brine of the vinyl phosphoric acid grafted hydroxyethyl cellulose into an 11 pound per gallon density $CaCl_2$ completion brine. The equivalent of 5 gallons per 1000 gallons of brine of 37 percent HCl also was added to the brine to facilitate hydration of the polymer. After about 1 hour a slurry of MgO in completion brine equivalent to 30 pounds per 1000 gallons of brine was added to the hydrated polymer. After crosslinking the gel was passed through a perforated plate having 1/8 inch diameter holes and the extruded gel particles were mixed with additional brine so as to comprise a 25 percent volume to volume ratio slurry. A sample then was placed in the fluid loss test cell. A second and third sample of the slurry were subjected to additional shearing to produce a product having a particle size distribution such as taught herein. These samples then were placed in fluid loss test cells as described above. The beneficial effects of the present invention are clearly set forth in the results illustrated in FIG. 1 for the tests.

EXAMPLE II

To illustrate the effectiveness of the present invention in establishing fluid loss control in high permeability formations, the following tests were performed using high pressure fluid loss test cells as described above. For comparison purposes a 50 pound per 1000 gallon xanthan gum viscosified fluid was prepared and tested in 5, 10 and 50 Darcy cores. No filter cake was produced in any core test. A sample of the gel prepared as described in Example 1 was subjected to additional shearing equivalent to about 65,000 $sec^{-1}$ and a quantity was mixed with a 2 percent KCl solution to provide 25 percent by weight and a second sample was prepared with a quantity of the 50 pound per 1000 gallon xanthan gum gel also including 25 percent by weight gel particles. The samples then were divided and tested on the 5, 10 and 50 Darcy cores. The spurt loss and fluid loss coefficient (Cw) are set forth in Table 1, below. A second gel sample was subjected to additional shearing equivalent to about 210,000 $sec^{-1}$ and samples were prepared in 2 percent KCl solution and xanthan gum gel and tested. The results of these tests also are set forth below.

TABLE I

| FLUID | CORE PERMEABILITY | Cw (ft/min$^{1/2}$) | Spurt (gal/ft$^2$) |
|---|---|---|---|
| Xanthan gel | 5 | No filter cake | |
| | 10 | No filter cake | |
| | 50 | No filter cake | |
| 2% KCl w/25% [1.] | 5 | 0.004592 | 2.45 |
| particulate gel | 10 | 0.00984 | 2.57 |
| | 50 | No filter cake | |
| 50# xanthan w/25% [1.] | 5 | 0.00164 | 1.1 |
| particulate gel | 10 | 0.0082 | 1.96 |
| | 50 | 0.1476 | 30.14 |
| 2% KCl w/25% [2.] | 5 | 0.00656 | 3.35 |
| particulate gel | 10 | 0.00328 | 1.06 |
| | 50 | No filter cake | |
| 50# xanthan w/ [2.] | 5 | 0.00082 | 0.93 |
| 25% particulate gel | 10 | 0.01312 | 1.96 |
| | 50 | 0.1558 | 32.59 |

[1.] 65,000 Sec$^{-1}$ shearing
[2.] 210,000 Sec$^{-1}$ shearing

While that which is believed to comprise preferred embodiments of the invention has been described herein, it is to be understood that changes or modifications in the method may be made by individuals skilled in the art without departing from the spirit or scope of the invention as set forth in the appended claims.

What is claimed is:

1. A method for controlling fluid loss in permeable formations penetrated by a wellbore comprising:

admixing an aqueous fluid with an effective amount of a polysaccharide polymer to viscosify said fluid and an effective amount of a crosslinking agent for said polysaccharide to create a crosslinked gel structure in said fluid;

shearing said crosslinked gel such that said gel is caused to break into particles having an average particle size in the range of from about 10 to about 80 mesh with at least 50 percent having an average particle size below about 20 mesh;

slurring said gel particles with an aqueous fluid whereby a suspension of said particles is produced;

introducing said suspension into said wellbore and into contact with a face of said permeable formation; and producing a filter cake comprised of said particles of crosslinked gel upon the face of said permeable formation whereby fluid loss to said formation through said filter cake is reduced.

2. The method of claim 1 wherein said polysaccharide comprises at least one member selected from the group consisting of guar, guar derivatives and cellulose derivatives.

3. The method of claim 1 wherein said crosslinking agent comprises at least one member selected from the group consisting of borates, titanium IV ions, zirconium IV ions, aluminum III ions and antimony V ions.

4. The method of claim 1 wherein said crosslinked gel is sheared by passage through a perforated plate, screen or die at a rate and pressure to cause formation of said particles.

5. The method of claim 1 wherein said slurry of particles is admixed with an additional quantity of a solid particulate whereby said additional solid particulate acts with said gel particles to reduce fluid loss to said formation.

6. A method of controlling fluid loss in a permeable formation from a wellbore penetrating the formation comprising:

admixing an aqueous fluid containing at least a trace amount of at least one divalent cation with a polymer derivative comprising a reaction product produced by the reaction of a hydroxyalkyl cellulose having a molar substitution of from about 1.5 to about 3, said alkyl being selected from the group of ethyl and propyl, and a vinyl phosphonic acid or salt in the presence of a redox system at a temperature in the range of from about 20° to about 60° C., said polymer being present in an amount sufficient to viscosify said aqueous fluid and a crosslinking activator comprising a Lewis base or a Bronsted-Lowry base present in a sufficient amount to initiate crosslinking of at least a portion of said polymer derivative in said aqueous fluid to produce a crosslinked gel;

shearing said crosslinked gel such that said gel is caused to break into particles having an average particle size in the range of from about 10 to about 80 mesh with at least about 50 percent having an average particle size below about 20 mesh;

slurring said gel particles with an aqueous fluid whereby a suspension of said particles is produced;

introducing said suspension into said wellbore and into contact with said permeable formation; and producing a filter cake comprised of said gel particles upon at least a portion of said permeable formation whereby fluid loss to said permeable formation is controlled.

7. The method of claim 6 wherein said crosslinking activator comprises at least one member selected from the group of magnesium oxide, mono, di or trialkanol amines, calcium oxide, sodium hydroxide, potassium hydroxide, ammonia, cocoamines, pentamines, alkyldiethanol amines, an admixture of boric acid and borate salts and diethylamine.

8. The method of claim 6 wherein said aqueous fluid admixed with said polymer derivative comprises a brine solution.

9. The method of claim 6 wherein said crosslinked gel is sheared by passage through a perforated plate or screen at a sufficient rate and pressure to cause formation of said particles.

10. The method of claim 6 wherein said base is magnesium oxide.

11. The method of claim 6 wherein said reaction to produce said polymer derivative is defined further as effected in a reaction media comprising at least one member selected from the group of tetramethyl ammonium chloride, polyethylene glycol and polypropylene glycol.

12. The method of claim 6 wherein said redox system comprises a peroxide and a metal ion reductant.

13. The method of claim 12 wherein said metal ion reductant comprises a source of ferrous ions.

14. The method of claim 6 wherein said gel particles have an average length of from about 0.1 to about 50 mm.

15. The method of claim 6 wherein said slurry of gel particles is admixed with an additional quantity of a solid particulate whereby said additional solid particles act with said gel particles to reduce fluid loss to said formation.

16. The method of claim 6 wherein said base is magnesium oxide and said base is admixed with said aqueous fluid in an amount in excess of that required for crosslinking activation and such excess base comprises solid particles that function with said gel particles to reduce fluid loss to said formation.

* * * * *